Patented Oct. 15, 1929

1,731,869

UNITED STATES PATENT OFFICE

ARTHUR LYELL RUSHTON AND MERLE M. SIMPSON, OF OMAHA, NEBRASKA, AND HERMAN C. BECKMAN, OF CEDAR LAKE, INDIANA, ASSIGNORS TO CREAM PROCESSES, INC., OF OMAHA, NEBRASKA, A CORPORATION OF DELAWARE

METHOD OF TREATING SOURED OR CURDLED MILKS FOR THE RECOVERY OF BUTTERFAT THEREFROM

No Drawing. Application filed June 6, 1928. Serial No. 283,451.

The invention is an improvement in the method of treating milk products as described and claimed in our application for U. S. Patent, Serial No. 257,554, filed February 27, 1928, for treating sour cream in the recovery of butterfat therefrom, and the primary object of our present invention is to provide an improved method of treating milks and milk products to recover butterfat from whole milk, evaporated or condensed whole milk, and buttermilk resulting from the manufacture of sweet cream butter, when these milks have the casein therein precipitated, coagulated or curdled, either by souring due to the development of acidity therein, usually lactic acid from the propagation of various types of bacteria, or in which coagulation or curdling and precipitation of the casein has resulted without the development of appreciable degrees of acidity as in those cases where such milks have the casein in the milk serum coagulated or curdled and precipitated in whole or in part, but remaining comparatively sweet or in a non-acid condition as when such coagulation or curdling has been produced by rennet or rennet-like enzymes without any appreciable production of acid, as in cheese or any form of sweet curdled milk or milk products. The invention also may be used in recovering butterfat from homogenized milk products.

A certain amount of fluid whole milk that is received by the dairies is too sour to sell for distribution and consumption as milk. This is due to the coagulation or curdling and precipitation of the casein through the ordinary lactic acid souring before its receipt and is too sour for successful or practical separation by passing the same through the ordinary centrifugal separator, as such milk will clog the separator almost immediately and render the process of removing the butterfat impracticable and unprofitable.

In the manufacture of concentrated milk products by evaporation, especially where such products are unsweetened, a certain amount of the evaporated or concentrated product is rejected and not sold for human consumption after being processed. This is largely due to the development of acidity in the product resulting from the introduction of bacteria from leaks in the cans, barrels or other closed receptacles in which such products are packed and attempted to be sealed for preservation and distribution. Such products depend upon efficient sterilization and packaging for their preservation. The introduction of bacteria, due to leaks, from defective containers results in souring, and such products are now either destroyed or sold as defective products at reduced rates and at considerable losses, for animal feeds, as to hogs, poultry and the like, although such products frequently contain as high as 7.8 per cent butterfat or more.

There has in more recent years developed an important branch of the dairy industry in the manufacture of sweet cream butter, that is butter which is churned from cream that has not been allowed to develop any considerable degree of acidity, that is, to become sour by the natural development of bacteria producing acid or from bacteria added as starters and the resulting buttermilk which is a by-product of this manufacture of sweet cream butter, ordinarily containing about .50 per cent butterfat or more as it comes from the churns, is readily separable by ordinary methods of centrifugal separation, so that a portion of this relatively large loss of butterfat may be recovered. However, if the original cream has had its natural acidity decreased to any considerable extent by the addition of the usual neutralizers prior to churning, or if the buttermilk which is a by-product of the churning of sweet cream, or comparatively neutral cream, has by reason of delay following the churning operation had its acidity increased to a point between .25 per cent and .35 per cent, it is found that centrifugal separation to recover the usual losses of butterfat from such buttermilk is commercially impracticable because of the great expense of such skimming operation due to the frequent clogging of the separator.

In the manufacture of butter from sour cream, it is usual to reduce the acidity with alkalies before churning. The amount of alkali used differs with the acidity of the various lots of cream, and several different alkalies such as calcium hydrate, sodium carbonate, and sodium bicarbonate are in common use for this purpose. The casein or curd content of buttermilk produced from sour cream butter therefore varies considerably in solubility in alkaline solutions. By adding sufficient alkali, preferably sodium hydroxide, the casein or curd can be softened or dissolved sufficiently to permit the separation of its butterfat by passing through a centrifugal separator.

In general, the degree of alkalinity, required to produce this result will vary from .10% to .45% expressed as sodium oxide, depending upon the amount and type of alkali used in reducing the acidity of the original sour cream.

The economic losses referred to with respect to evaporated whole milk which has become soured as described are accordingly substantially duplicated with respect to the soured fluid or whole milk as well as to soured buttermilk from sweet cream butter according to the prevailing practices in the dairy industry. Our invention is directed and adapted to the recovery of butterfat losses from these three classes of milks and the method of treatment to be applied to each of the three classes of milks is similar, having due regard to the condition of the milk before processing. In the case of the soured fluid or whole milk containing the milk serum with the normal amount of water, and in the case of the soured buttermilk from sweet cream butter, which, of course, contains the normal milk serum plus any water that might be introduced during or following the churning operation as in the washing operation in the churn during or following the discharge of the buttermilk, these two classes of milks are in condition for immediate processing when the casein in the milk serum is found to be curdled or coagulated in a manner making centrifugal separation impossible, inexpedient or unprofitable. In practicing our invention in the case of soured evaporated whole milk to recover the butterfat therefrom, we prefer to add sufficient water to the evaporated milk to bring this product back to the substantially normal per cent of solids or to a condition where the milk serum with respect to moisture will be in substantially the condition of fluidity of the normal soured buttermilk from sweet cream butter and the normal soured fluid or whole milk.

In processing, each and all of these three classes of milks, due regard first being had to the restoring of the normal quantity of water to the soured evaporated milk, we have discovered that by employing hydroxides, as sodium hydroxide, (NaOH) in treating each of these three classes of milks in which the casein of the milk serum has become curdled or coagulated for either of the two reasons stated, surprisingly satisfactory results may be secured by rendering these products alkaline, preferably about .20 per cent alkalinity, expressed as sodium hydroxide when NaOH is used. Where in the claims we specify an alkali hydroxide we mean to include equivalent hydroxides.

In processing, these three classes of milks when containing a substantially normal quantity of water are treated without any special regard to temperature, ordinary room temperatures being efficient, by the addition thereto of a solution of sodium hydroxide and water by stirring such solution into the milks and thoroughly intermixing the same therewith until the desired alkalinity, preferably about .06 per cent expressed as sodium oxide, is reached. After thorough mixing the milks in each case are allowed to stand for a period of time approximating 15 or 20 minutes, which will ordinarily be sufficient to complete the reaction of the alkaline solution for the milks, after which it will be found that the milks so treated are in condition for satisfactory centrifugal separation. Thus in the case of the soured fluid or whole milk permitting the separation of the butterfat which will be taken therefrom by the ordinary centrifugal separator in an efficient manner for churning or other uses, the skim milk from the separator in this process will again become acid if allowed to stand due to the subsequent normal development of lactic acid producing bacteria therein and will be found satisfactory for feeding livestock. This will be true whether the whole milk so treated has been soured or whether the casein has been curdled or coagulated by the action of rennet-like enzymes without the production of acid. In the case of soured evaporated whole milk with its substantially normal quantity of water added thereto before processing in the manner described, it will be found that the butterfat may be readily removed by the ordinary method of centrifugal separation after the addition of sufficient sodium hydroxide (NaOH) in substantially the amount stated to dissolve the curd. In this case the fluid from the skim milk spout may again be allowed to become acid by the further development therein of acid producing bacteria and will have a certain value as a soured skim milk for feeding purposes or subsequent condensing to produce a concentrated acid milk food product, which may obviously also be readily done with the skim milk from the separator taken from the whole milk according to the process as stated.

When the process is applied to the recovery of the butterfat from soured buttermilk, originally a by-product from the manufacture of sweet cream butter, the fluid serum from the skim milk spout of the separator will have the usual value of buttermilk for all feeding purposes and the acidity therein may, if desired, be allowed to develop as in the case of the other milks mentioned, and when sufficient acid has been developed in the buttermilk coming from the skim milk spout of the separator, it may be processed to produce a concentrated or a dried buttermilk product by the usual methods well understood and practiced in this art.

The importance of our invention in the conservation of the more valuable butterfat constituent of acid or curdled milk may be appreciated when it is understood that in the operation of an ordinary dairy supplying in the neighborhood of 125,000 to 150,000 people where whole milk is received for the manufacture of butter, it is commonly found that the losses due to the development of lactic acid in whole milk before it can be received and separated often run as much as from twenty-five dollars to fifty dollars per day, as the development in the whole milk of substantially the acidity stated renders centrifugal separation impossible or unprofitable and the practice is to dump the acid whole milk containing the butterfat into the buttermilk coming from the churns where it is disposed of in the same manner as such buttermilk which is treated as a by-product and processed by known methods for producing either concentrated moist or dried buttermilk products or disposed of as animal food at inferior prices as a normal buttermilk. The invention furthermore obviates the common excessive losses of butterfat previously experienced in the manufacture of sweet cream butter as well as a considerable portion of losses heretofore sustained in the manufacture and distribution of evaporated whole milk.

It has been found particularly difficult to satisfactorily separate the butterfat from whole milk which has been homogenized by passing same through the ordinary commercial homogenizing machine. We find that if such homogenized whole milk, or any homogenized milk product containing butterfat, from which it is desired to remove the butterfat, shall be treated in accordance with the process herein described, that is, if such milk be treated with sodium hydroxide to render the homogenized milk, preferably about .20% alkalinity, expressed as sodium hydroxide when NaOH is used, or .06%, expressed as sodium oxide, after such mixture is allowed to stand for a period of time as in case of the other milks stated to allow the completion of the reaction of the alkaline solution, homogenized milk products so treated will be found to be in a very satisfactory condition for centrifugal separation and the recovery of butterfat therefrom.

We find that our invention is adaptable to the recovery of butterfat from cheese or cheesy products which frequently contain quite appreciable quantities of butterfat, especially when made from whole milk and from which it may be desired in reprocessing to remove the butterfat. Such cheesy products will be first ground to a fine condition and as in the case of condensed milk, sufficient moisture, preferably in the form of water, added to reduce the cheesy product to approximately the consistency of whole milk, or at least to a consistency where it will flow readily, after which the same should be treated with a solution of sodium hydroxide, by stirring such solution into the product and thoroughly intermixing the same therewith until an alkalinity of approximately .20% expressed as sodium hydroxide when NaOH is used, or about .06% expressed as sodium oxide. After allowing the material thus treated to stand to permit a complete reaction of the alkaline solution, it will be found that the resulting product may be satisfactorily passed through a centrifugal separator and very considerable and satisfactory quantities of the butterfat removed or skimmed therefrom.

Having described our invention what we claim is new and desire to secure by Letters Patent, is:

1. The method of treating soured milk containing a substantially normal quantity of water for the recovery of butterfat therefrom which consists in rendering the milk alkaline by the addition of an alkali hydroxide and subsequently separating the butterfat while the milk remains in a condition of alkalinity.

2. The method of treating milk containing a substantially normal quantity of water for recovering the butterfat therefrom which consists in rendering the coagulated or curdled milk alkaline by the addition of oxide of sodium, and subsequently separating the butterfat therefrom while the milk remains in a condition of alkalinity.

3. The method of treating milk in which the casein has become coagulated or curdled for recovering the butterfat therefrom which consists in rendering the coagulated or curdled milk alkaline by the addition of an alkali hydroxide to dissolve the caseous matter, and subsequently separating the butterfat therefrom prior to the formation of sufficient acidity to re-coagulate the caseous matter therein.

4. The method of treating milk in which the casein has become coagulated or curdled for recovering the butterfat therefrom which consists in rendering the coagulated or curdled milk alkaline by the addition of sodium hyroxide to a degree sufficient to dissolve any curds of a caseous matter, and subsequently separating the butterfat therefrom prior to the development of acidity sufficient to re-coagulate the caseous matter therein.

5. The method of treating a milk product in which the casein is co-agulated or curdled and concentrated into a cheesy condition for the purpose of removing butterfat therefrom which consists in first reducing the cheesy material to relatively fine particles and preparing an emulsion therefrom by the addition of water, then rendering the same alkaline by the addition of sodium hydroxide to a degree sufficient to dissolve curds of caseous matter therein, and subsequently separating the butterfat therefrom by a centrifugal machine while the same remains in a condition of alkalinity.

Signed at Omaha, Nebraska, this 31st day of May, 1928.

ARTHUR LYELL RUSHTON.
MERLE M. SIMPSON.

Signed at Chicago, Illinois, this 29th day of May, 1928.

HERMAN C. BECKMAN.